US012706626B2

(12) United States Patent
Phan Huy et al.

(10) Patent No.: US 12,706,626 B2
(45) **Date of Patent: *Aug. 11, 2026**

(54) DEVICE FOR CONTROLLING THE OPERATION OF A WIRELESS TDD COMMUNICATION DEVICE, AND ASSOCIATED CONTROL METHOD

(71) Applicant: Orange, Issy-les-Moulineaux (FR)

(72) Inventors: Dinh Thuy Phan Huy, Châtillon Cedex (FR); Dominique Barthel, Châtillon Cedex (FR); Philippe Ratajczak, Châtillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 656 days.

This patent is subject to a terminal disclaimer.

(21) Appl. No.: 17/923,144

(22) PCT Filed: Apr. 27, 2021

(86) PCT No.: PCT/FR2021/050726

§ 371 (c)(1),
(2) Date: Nov. 3, 2022

(87) PCT Pub. No.: WO2021/224564

PCT Pub. Date: Nov. 11, 2021

(65) Prior Publication Data

US 2023/0179246 A1 Jun. 8, 2023

(30) Foreign Application Priority Data

May 4, 2020 (FR) ...................................... 2004385

(51) Int. Cl.

| | |
|---|---|
| ***H04B 1/18*** | (2006.01) |
| ***H04B 1/00*** | (2006.01) |
| ***H04B 5/45*** | (2024.01) |

(52) U.S. Cl.
CPC ............... *H04B 1/18* (2013.01); *H04B 1/006* (2013.01); *H04B 5/45* (2024.01)

(58) Field of Classification Search
CPC .......... H04B 1/18; H04B 1/0458; H04B 1/40; H04B 1/006; H04B 1/48; H04B 1/0057;
(Continued)

(56) References Cited

U.S. PATENT DOCUMENTS

2005/0152292 A1* 7/2005 McDonald ......... G06K 19/0712 333/124
2013/0035048 A1* 2/2013 Chee ........................ H04B 1/48 29/601

(Continued)

OTHER PUBLICATIONS

International Search Report and Written Opinion dated Jul. 9, 2021 for Application No. PCT/FR2021/050726.

(Continued)

*Primary Examiner* — Ajibola A Akinyemi
(74) *Attorney, Agent, or Firm* — Knobbe, Martens, Olson & Bear, LLP

(57) ABSTRACT

A control device for controlling the operation of a wireless communication device is described. The wireless communication device includes an antenna, a front-end module configured for transmitting and receiving signals according to a time-division multiplexing scheme, and switching means which can switch the front-end module between first and second modes in which the front-end module presents different impedances to the antenna The control device can be integrated in the communication device and includes a control module to control the switching means so that the front-end module alternates between the first and second modes so that the communication device backscatters an ambient signal.

13 Claims, 5 Drawing Sheets

(58) Field of Classification Search
CPC . H04B 1/525; H04B 1/44; H04B 1/04; H04B 1/406; H04B 17/318; H04B 1/0475; H04B 5/77; H04B 1/0064; H04B 1/005; H04B 17/12; H04B 5/26
USPC ........................................................ 455/552.1
See application file for complete search history.

(56) References Cited

U.S. PATENT DOCUMENTS

| | | | | |
|---|---|---|---|---|
| 2016/0261976 | A1 | 9/2016 | Butler et al. | |
| 2022/0077886 | A1* | 3/2022 | Yan | H04K 1/02 |

OTHER PUBLICATIONS

Van Huynh Nguyen et al. “Ambient Backscatter Communications: A Contemporary Survey” IEEE Communications Surveys & Tutorials, vol. 20, No. 4, Nov. 19, 2018 (Nov. 19, 2018), pp. 2889-2922.

* cited by examiner

[Fig. 1]
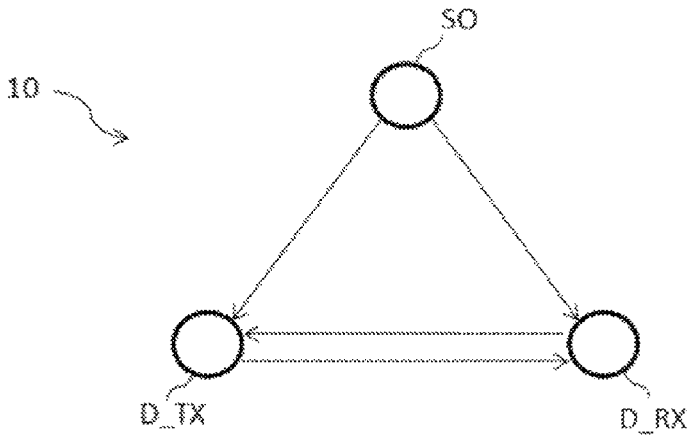
[Fig. 2]
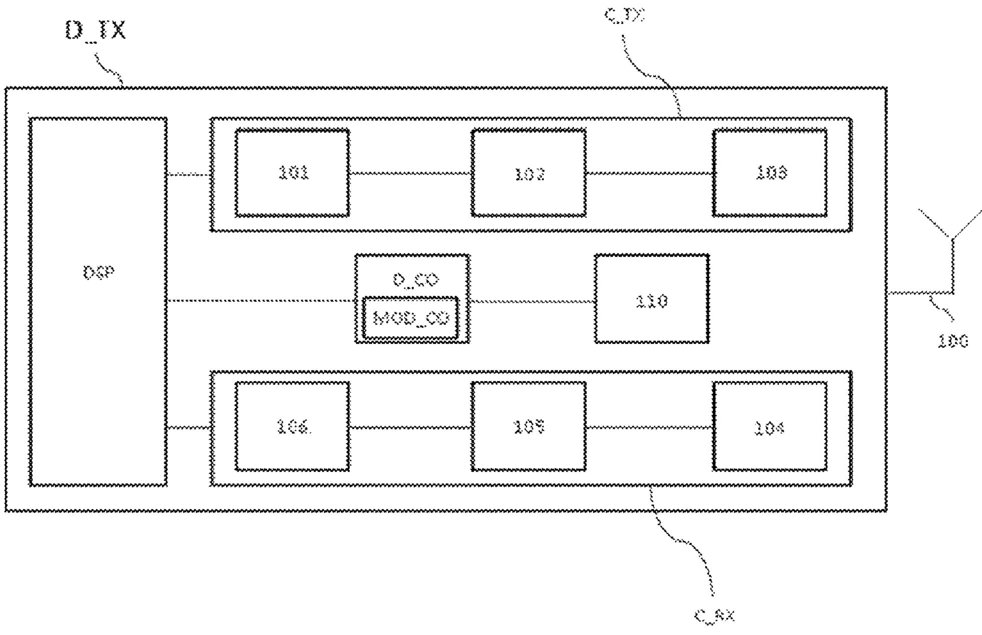

[Fig. 3]
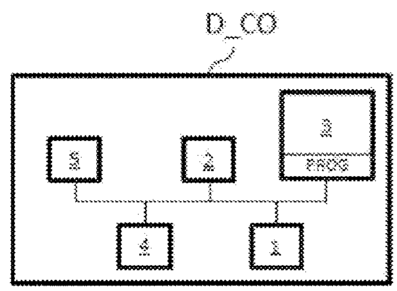
[Fig. 4]
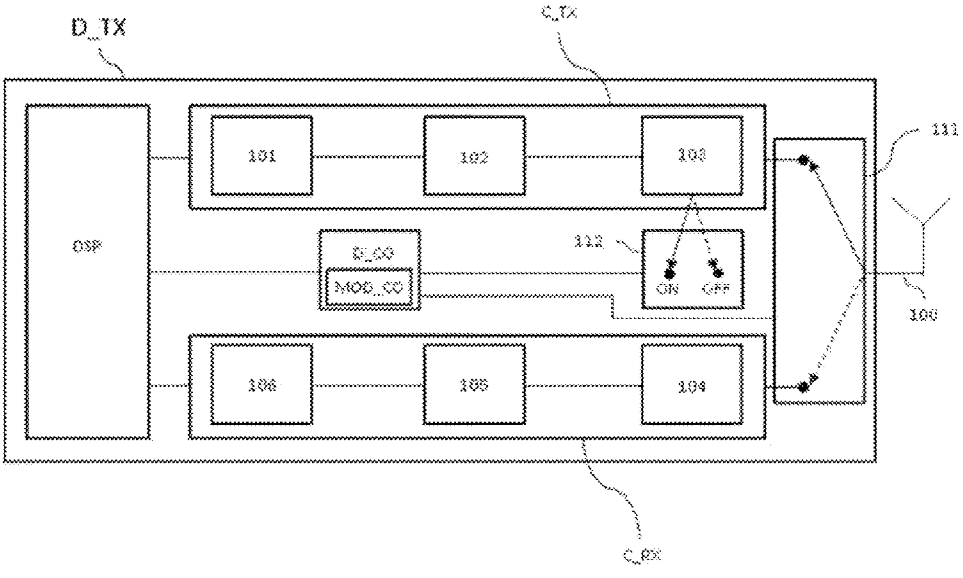

[Fig. 5]
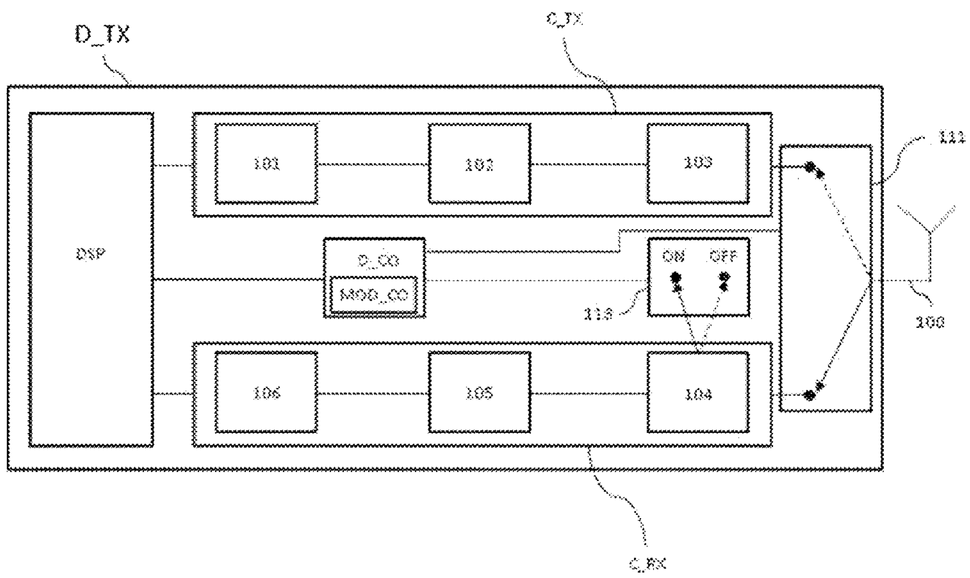
[Fig. 6]
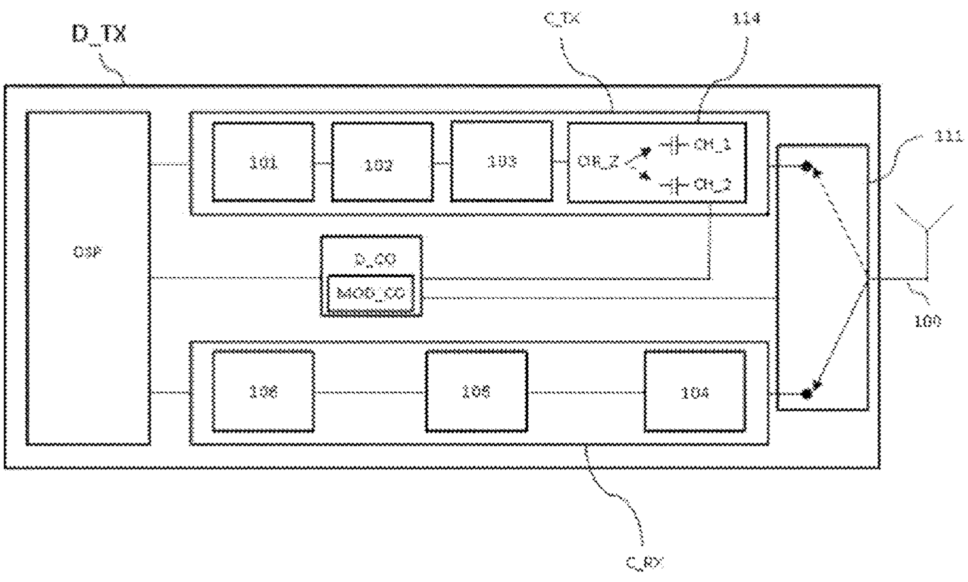

[Fig. 7]
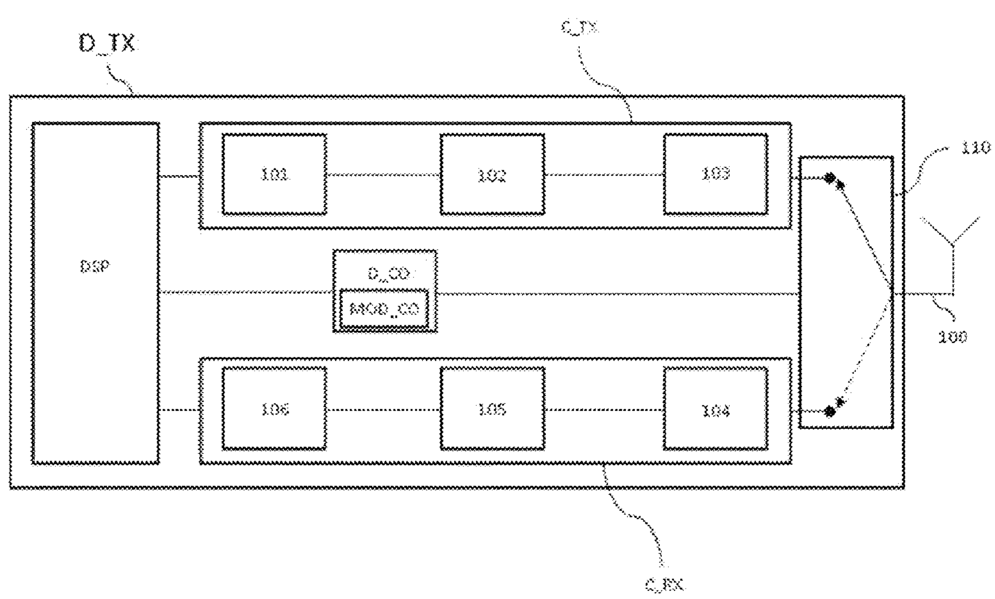
[Fig. 8]
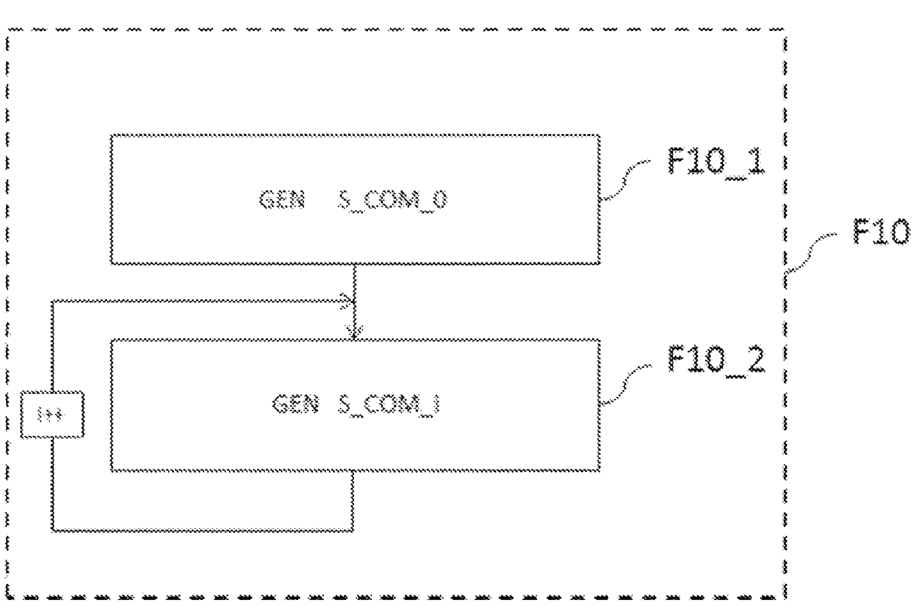

[Fig. 9]
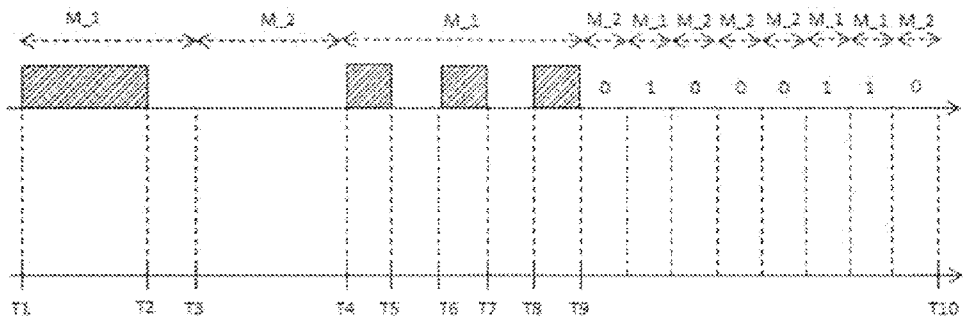

DEVICE FOR CONTROLLING THE OPERATION OF A WIRELESS TDD COMMUNICATION DEVICE, AND ASSOCIATED CONTROL METHOD

RELATED APPLICATIONS

This application is the U.S. National Phase of Application No. PCT/FR2021/050726 entitled "DEVICE FOR CONTROLLING THE OPERATION OF A WIRELESS TDD COMMUNICATION DEVICE, AND ASSOCIATED CONTROL METHOD" and filed Apr. 27, 2021, which claims the benefit of French Patent Application No. 2004385, filed May 4, 2020, each of which is incorporated by reference in its entirety.

PRIOR ART

The present invention belongs to the general field of telecommunications. It relates more particularly to a device for controlling the operation of a wireless communication device, as well as an associated control method. It also relates to a wireless communication device including such a controlling device as well as a wireless communication system including such a wireless communication device. The invention finds a particularly advantageous application, although in no way limiting, for applications of the "Internet of Things" (IoT) type.

The architecture of a wireless communication device, such as for example a mobile terminal, for emitting and receiving signals according to a time-division multiplexing scheme called TDD (Time Division Duplex), is well known and widely used today in radio communication systems. Briefly, it is recalled here that such a TDD scheme allows a telecommunication channel using the same transmission resource (a radio channel for example) to time-division multiplex the emission and reception.

Thus, and in a conventional manner, such architecture includes a front-end module comprising an RF (Radio Frequency) emission chain as well as an RF reception chain. These emission and reception chains are arranged between an antenna to which they can be connected thanks to switching means, such as typically a duplexer, and an electronic signal processing unit called "DSP" (Digital Signal Processing) unit configured to provide a baseband signal to the emission chain but also to process a signal received via the reception chain.

Each chain includes a plurality of pieces of electronic equipment. As regards the emission chain, such pieces of equipment are conventionally, in the direction from the DSP unit to the antenna, a digital-analog converter, a filtering piece of equipment, such as for example a low-pass filter, a modulator and a power amplifier. This emission chain can also comprise other pieces of equipment, such as a quartz oscillator, a frequency synthesizer, etc.

As regards the reception chain, such pieces of equipment are conventionally, in the direction from the antenna to the DSP unit, a low-noise amplifier, a demodulator, a filtering piece of equipment, such as for example a low-pass filter, and an analog-to-digital converter. Here again, this reception chain can include other pieces of equipment, such as a quartz oscillator, a frequency synthesizer, etc.

It should be noted that this example of conventional architecture is given here for illustrative purposes only. Other variants of this example are well known to those skilled in the art, in particular as regards the number of antennas, but also the number of emission/reception chains, and are described, for example, in the document: "Design of Reconfigurable Radio Front-Ends", Xiao Xiao, Electrical Engineering and Computer Sciences, University of California at Berkeley, Technical Report n° UCB/EECS-2018-142.

Although such a conventional architecture advantageously allows establishing remote communications over long ranges, it is nevertheless very energy-consuming. Indeed, when the communication device is switched on, some of said electronic pieces of equipment are permanently powered. These are primarily the power amplifier, or the low-noise amplifier, but also, to a lesser extent, the digital-analog and analog-digital converters, the quartz oscillator, the frequency synthesizer, etc.

Such energy consumption is problematic because, in particular, it induces significant operating costs for the communication device (example: very frequent recharging of the battery of a mobile telephone).

To at least partly overcome this drawback, methods have been proposed consisting in modifying said conventional architecture by including therein other switching means, such as for example a selection switch, configured to selectively switch off or power an energy-intensive electronic piece of equipment such as those mentioned above. For example, the emission chain is connected to the antenna, said other switching means allow powering an electronic piece of equipment (power amplifier, digital-analog converter, etc.) during the emission of a message and, conversely, allow switching off this piece of equipment when no message needs to be emitted. Similarly, the reception chain is connected to the antenna, said other switching means allow powering an electronic piece of equipment (low-noise amplifier, analog-digital converter, etc.) when receiving a message and, conversely, allow switching off this piece of equipment when no message needs to be received.

Implementations of these more energy-efficient methods are for example described in the documents:

"Energy-Efficient Base-Stations Sleep-Mode Technique in Green Cellular Networks: a Survey", J. Wu, Y. Zhang, M. Zukerman and E. K. Yung, IEEE Communications Surveys & Tutorials, vol. 17, n° 2, pp. 803-826, 2015;

"Enhanced discontinuous reception mechanism for power saving in TD-LTE", F. Li, Y. Zhang, L. Li, 2010 3rd International Conference on Computer Science and Information Technology, Chengdu, pp. 682-686, 2010.

Although these methods allow selectively switching off an energy-intensive electronic piece of equipment, they are nevertheless still very energy-consuming precisely because of the very use of this pieces of equipment during the emission or reception of a message. This is all the more problematic when this energy consumption is related to the range of a communication. It is indeed understood that when this range is low, for example less than one meter, the operating energy cost of a wireless communication device implementing these methods is particularly high.

DISCLOSURE OF THE INVENTION

The present invention aims to overcome all or part of the drawbacks of the prior art, in particular those set out above, by proposing a solution that allows, in comparison with the solutions of the prior art, reducing the energy consumption of a wireless communication device including a conventional architecture to operate according to a TDD scheme, and in particular reducing the ratio between energy consumption and range of a communication.

To this end, and according to a first aspect, the invention relates to a device for controlling the operation of a wireless communication device including an antenna, a front-end module configured for the emission and reception of signals via said antenna according to a time-division multiplexing scheme, as well as switching means designed to configure said front-end module according to at least two modes including:

- a first mode in which the front-end module presents a first impedance to the antenna,
- a second mode in which the front-end module presents a second impedance to the antenna, said first and second impedances being distinct from each other.

Furthermore, said controlling device is intended to be integrated to said communication device and includes a controlling module configured to control said switching means so that the front-end module alternates between said first and second modes and thus so that the communication device selectively varies its ambient signal backscatter.

Thus, a controlling device configured in software and hardware is proposed to create variations in the impedance presented to the antenna (i.e. related to the antenna or connected to the port of the antenna) equipping the wireless communication device.

The invention therefore allows taking advantage of these impedance variations generated thanks to the controlling device so that the wireless communication device is configured to backscatter an ambient signal emitted by an emitting source.

Ambient backscatter communication technology is well known today. The technical principles on which this technology is based are described, in particular, in the document: "Ambient Backscatter Communications: A Contemporary Survey", N. Van Huynh, D. Thai Hoang, X. Lu, D. Niyato, P. Wang, D. In Kim, IEEE Communications Surveys & Tutorials, vol. 20, no. 4, pp. 2889-2922, Fourthquarter 2018.

Conventionally, the backscatter of an ambient signal takes place between a transmitting device (in this case, in the context of the present invention, the wireless communication device equipped with said controlling device) and a receiving device distinct from the source emitting the ambient signal. To communicate with the receiving device, the transmitting device uses the ambient signal to send data to said receiving device. More particularly, the transmitting device reflects the ambient signal towards the receiving device, possibly by modulating it. The signal thus reflected is called "backscattered signal", and is intended to be decoded by the receiving device (i.e. the receiving device extracts from the backscattered signal information transmitted by the transmitting device, for example in the form of bits).

The fact that no additional radio wave (in the sense of a wave other than the one derived from the ambient signal) is emitted by the transmitting device makes the ambient backscatter technology particularly attractive. Indeed, the energy cost of a communication is thus optimized, which is in particular important in the current context of the IoT where each object of everyday life is intended to become a communicating object.

To implement the ambient backscatter communication technology, the transmitting device is therefore configured with a controlling device to interact in a variable manner (enter into resonance in a variable manner), via the antenna, with the ambient signal, so as to be configured to move from a first state associated with said first mode to a second state associated with said second mode. These two modes differ from each other in terms of backscatter, so that they can be distinguished at the receiving device. The receiving device, for its part, is configured to decode the signal possibly backscattered by the transmitting device.

In practice, this decoding is effectively implemented when the deviation in the electromagnetic power received by the receiving device, between instants when the transmitting device is respectively in the first state and in the second state, exceeds a determined threshold, called "power threshold", above the noise level of the receiver (which is constant). Indeed, if this power threshold is not reached, difficulties may arise on the side of the receiving device to detect that the transmitting device is in a backscatter state.

Also, and in a conventional manner, the ambient backscatter communication can be implemented effectively (i.e. reaching of said power threshold) as soon as the first state and the second state of the transmitting device are distinctly backscattering and non-backscattering, and as the transmitting and receiving devices are close to each other and/or as the transmitting device is close to the emitting source. For example, it is generally considered that the term "close" refers to a distance substantially equal to a half wavelength of the center frequency of the working band. These aspects are well known to those skilled in the art, and consequently are not described further here. For more details, it is possible to refer for example to the document: "Demo Abstract: Spatial modulation based transmission using a reconfigurable antenna", Y. Kokar, K. Rachedi, A. Ourir, J. de Rosny, D. T. Phan Huy, J. C. Prévotet, M. Hélard, Proc. IEEE INFOCOM'19 Demo Session, 29 Apr.-2 May 2019, Paris.

In any case, the invention advantageously allows using the existing hardware and software architecture of the wireless communication device, the controlling module being configured to generate impedance differences based on this architecture. In this way, the wireless communication device is provided with an additional communication mode, namely therefore an ambient backscatter communication mode, in addition to the communication modes conventionally associated with a time-division multiplexing scheme (i.e. data exchanges via the emission/reception chains and the radiation of the antenna).

Consequently, the controlling device according to the invention offers the possibility to reduce the energy-consumption of the wireless communication device when it is appropriate for the latter to communicate by ambient backscatter, that is to say typically and as already mentioned above, when it in the vicinity of a receiving device with which it wishes to communicate and/or when it is in the vicinity of the emitting source. In other words, in these situations, the invention allows avoiding using a traditional communication mode involving the use of an emission or reception chain as well as the radiation of the antenna.

In particular embodiments, the controlling device can further include one or several of the following characteristics, taken in isolation or in all technically possible combinations.

In particular embodiments, the ambient signal is backscattered under the controlling of the impedance variation operated by said controlling device.

In particular embodiments, the front-end module includes an emission chain and a reception chain, the switching means including:

- first switching means configured to selectively connect the antenna to the emission chain or to the reception chain,
- second switching means configured to selectively switch off or power a given electronic piece of equipment of a chain, called "processing chain", among said emission and reception chains, said first/second mode corresponding to a configuration in which the processing chain is connected to the antenna thanks to said first switching means and in which said electronic piece of equipment is switched off/powered thanks to said second switching means.

Such dispositions therefore allow the controlling module to control the power supply of an electronic piece of equipment of the processing chain to generate the impedance variation from which an ambient signal can be backscattered.

Moreover, these dispositions are also advantageous insofar as they allow reducing energy consumption when no data is to be transmitted by the wireless communication device. Indeed, in this case, said electronic piece of equipment is switched off.

In particular embodiments, the processing chain is the emission chain and said electronic piece of equipment is a power amplifier or a digital-analog converter.

In particular embodiments, the processing chain is the reception chain and said electronic piece of equipment is a low-noise amplifier or an analog-digital converter.

In particular embodiments, the front-end module includes an emission chain and a reception chain, the switching means being configured to selectively connect the antenna to the emission chain or to the reception chain, said first/second mode corresponding to a configuration in which the emission/reception chain is connected to the antenna thanks to said switching means.

Such dispositions therefore allow the controlling module to control the connection of the emission/reception chains to the antenna in order to generate the impedance variation from which an ambient signal can be backscattered. Such a configuration is not very complex to implement, and its cost is therefore reduced. Consequently, the control of such switching means is also simpler to implement.

In particular embodiments, the front-end module includes an emission chain and a reception chain, the switching means including:

- first switching means configured to selectively connect the antenna to the emission chain or to the reception chain,
- second switching means belonging to a chain, called "processing chain", among said emission and reception chains, and including an impedance matching circuit configurable according to at least two distinct configurations, a first configuration and a second configuration, said first/second mode corresponding to a configuration in which the processing chain is connected to the antenna thanks to said first switching means and in which the impedance matching circuit is configured according to said first configuration/said second configuration thanks to said second switching means.

According to a second aspect, the invention relates to a wireless communication device including an antenna, a front-end module configured for the emission and reception of signals via said antenna according to a time-division multiplexing scheme, as well as switching means designed to configure said front-end module according to at least two modes including:

- a first mode in which the front-end module presents a first impedance to the antenna,
- a second mode in which the front-end module presents a second impedance to the antenna, said first and second impedances being distinct from each other.

Furthermore, said wireless communication device includes a controlling device according to the invention.

According to a third aspect, the invention relates to a wireless communication system including:

- an emitting source configured to emit an ambient signal,
- a first wireless communication device according to the invention,
- a second wireless communication device configured to receive the ambient signal backscattered by said first communication device.

According to a fourth aspect, the invention relates to a method for controlling the operation of a wireless communication device including an antenna, a front-end module configured for the emission and reception of signals via said antenna according to a time-division multiplexing scheme, as well as switching means designed to configure said front-end module according to at least two modes including:

- a first mode in which the front-end module presents a first impedance to the antenna,
- a second mode in which the front-end module presents a second impedance to the antenna, said first and second impedances being distinct from each other.

Furthermore, said control method is implemented by a controlling device according to the invention, integrated to said wireless communication device and includes a step of controlling said switching means so that the front-end module alternates between said first and second modes and thus so that the communication device selectively varies its ambient signal backscatter.

According to a fifth aspect, the invention relates to a computer program including instructions for the implementation of a control method according to the invention when said program is executed by a computer.

This program can use any programming language, and be in the form of source code, object code or intermediate code between source code and object code, such as in partially compiled form, or in any other desirable form.

According to a sixth aspect, the invention relates to a computer-readable information or recording medium on which a computer program according to the invention is recorded.

The information or recording medium can be any entity or device capable of storing the program. For example, the medium can include a storage means, such as a ROM, for example a CD ROM or a microelectronic circuit ROM, or a magnetic recording means, for example a floppy disk or a hard disk.

On the other hand, the information or recording medium can be a transmissible medium such as an electrical or optical signal, which can be conveyed via an electrical or optical cable, by radio or by other means. The program according to the invention can be particularly downloaded from an Internet-type network.

Alternatively, the information or recording medium can be an integrated circuit in which the program is incorporated, the circuit being adapted to execute or to be used in the execution of the method in question.

According to a seventh aspect, the invention relates to a communication method implemented by a wireless communication system according to the invention, in which an ambient signal emitted by the emitting source is backscattered by the first wireless communication device and received by the second wireless communication device.

BRIEF DESCRIPTION OF THE DRAWINGS

Other characteristics and advantages of the present invention will emerge from the description given below, with reference to the appended drawings which illustrate one exemplary embodiment devoid of any limitation. On the figures:

FIG. 1 schematically represents, in its environment, a particular embodiment of a communication system according to the invention;

FIG. 2 schematically represents an example of hardware architecture of a wireless communication device according to the invention belonging to the communication system of FIG. 1;

FIG. 3 schematically represents an example of hardware architecture of a controlling device according to the invention equipping the wireless communication device of FIG. 2;

FIG. 4 schematically represents a first embodiment of switching means of the wireless communication device;

FIG. 5 schematically represents a second embodiment of switching means of the wireless communication device;

FIG. 6 schematically represents a third embodiment of switching means of the wireless communication device;

FIG. 7 schematically represents a fourth embodiment of switching means of the wireless communication device;

FIG. 8 represents, in the form of a flowchart, one particular exemplary implementation of a control method according to the invention;

FIG. 9 schematically represents one example of a data transmission scenario implemented by the transmitting device D_TX.

DESCRIPTION OF THE EMBODIMENTS

FIG. 1 schematically represents, in its environment, one particular embodiment of a wireless communication system 10 according to the invention.

As illustrated in FIG. 1, the wireless communication system 10 includes an emitting source SO configured to emit, according to an emission frequency F_E comprised in a given frequency band called "emission band", a radio signal called "ambient signal". The emission of the ambient signal is carried out for example permanently or recurrently.

For the remainder of the description, and as illustrated in FIG. 1, the case where the ambient signal is only emitted by a single source is considered without any limitation. The choice consisting in considering a single source is made here only for the purpose of simplifying the description. Also, no limitation is attached to the number of sources that can be considered in the context of the present invention, the developments that follow being indeed generalizable without difficulty by those skilled in the art in the case of a plurality of sources that are not consistent with each other.

By "radio signal", reference is here made to an electromagnetic wave propagating by non-wired means, whose frequencies are comprised in the traditional spectrum of the radio waves (a few hertz to several hundred gigahertz).

By way of non-limiting example, the ambient signal is a 4G mobile telephone signal emitted in the emission band [811 MHz, 821 MHz] by the source SO which takes the form of a relay antenna.

It should however be specified that the invention remains applicable to other types of radio signals, such as for example a mobile telephone signal other than 4G (for example 2G, 3G, 5G), a Wi-Fi signal, a WiMax signal, a DVB-T signal, etc. In general, no limitation is attached to the ambient radio signal that can be considered in the context of the present invention. Consequently, it should be noted that the number of antennas equipping the source SO does not constitute a limiting factor of the invention.

The communication system 10 also includes a first wireless communication device, called "transmitting device" D_TX, as well as a second wireless communication device, called "receiving device" D_RX and distinct from the source SO, respectively configured to communicate with each other, as detailed below.

In the following description, and as illustrated in FIG. 1, it is considered in a non-limiting manner that the communication system 10 comprises a single transmitting device D_TX and a single receiving device D_RX. It should however be specified that the invention is also applicable to a communication system comprising a plurality of transmitting devices and/or a plurality of receiving devices, this aspect not constituting a limiting factor for the invention.

It is also considered in the remainder of the description that the transmitting device D_TX is a mobile telephone of the smartphone type. It should however be noted that no limitation is attached to the nature of said transmitting device D_TX as soon as the latter is configured to carry out wireless communications. For example, it can be a laptop computer, a personal assistant, a communicating object, etc.

FIG. 2 schematically represents an example of hardware architecture of the transmitting device D_TX according to the invention belonging to the communication system 10 of FIG. 1.

As illustrated in FIG. 2, the transmitting device D_TX is equipped with an antenna 100. The transmitting device D_TX also includes a front-end module configured for the emission and reception of signals via said antenna 100 according to a time-division multiplexing scheme TDD (Time Division Duplex by using the same radio channel). Conventionally, said front-end module includes an emission chain C_TX and a reception chain C_RK.

In this exemplary embodiment, said emission chain C_TX includes a digital-analog converter 101, a modulator 102 and a power amplifier 103. The reception chain C_RX, for its part, includes a low-noise amplifier 104, a demodulator 105 and an analog-digital converter 106.

Said transmitting device D_TX also includes an electronic signal processing unit, called "DSP" unit, configured to generate baseband signals intended to be routed to the antenna via the emission chain C_TX and to process signals received by the antenna and routed to said DSP unit via the reception chain C_RX.

For this purpose, the DSP unit includes for example one or several processors and storage means (magnetic hard disk, electronic memory, optical disk, etc.) in which data and a computer program are stored, in the form of a set of program code instructions to be executed in order to implement the aforementioned signal processings.

Alternatively or additionally, the DSP unit also includes one or several programmable logic circuits, of the FPGA, PLD, etc. type, and/or specific integrated circuits (ASIC), and/or a set of discrete electronic components, etc. adapted to implement said signal processings.

In other words, the DSP unit includes a set of means configured in software (specific computer program) and/or hardware (FPGA, PLD, ASIC, etc.) to implement said signal processings.

In general, those skilled in the art are familiar with the conventional architecture of a transmitting device D_TX capable of emitting signals according to a time-division multiplexing scheme, this aspect therefore not being detailed further here.

It should also be noted that the emission chain C_TX and/or the reception chain C_RX can also include other electronic pieces of equipment. Furthermore, no limitation is attached to the number of antennas that can equip the transmitting device D_TX, nor even to the number of emission and reception chains, it being understood that the number of antennas is greater than or equal to the number of emission chains as well as to the number of reception chains, this aspect also being known to those skilled in the art.

The transmitting device D_TX also includes switching means 110 designed to configure said front-end module according to at least two modes including:

- a first mode M_1 in which the front-end module presents a first impedance to the antenna 100,
- a second mode M_2 in which the front-end module presents a second impedance to the antenna 100, said first and second impedances being distinct from each other.

By "impedance presented to the antenna", reference is made here to the equivalent impedance of the electronic circuits connected at a given instant to the antenna 100, this impedance therefore depending on the mode in which the front-end module is configured via said switching means 110.

It is important to note that FIG. 2 here schematically illustrates the general structure of the transmitting device D_TX according to the invention. Thus, different embodiments of said switching means 110 are described in more detail later through different figures.

In addition, the transmitting device D_TX includes a controlling device D_CO implementing processings aimed at allowing the transmitting device D_TX to selectively vary the backscatter of the ambient signal emitted by the source SO, by implementing a control method of the operation of said transmitting device D_TX.

In the present embodiment, the antenna 100 of the transmitting device D_TX is configured, in a manner known per se, to receive the ambient signal but also to backscatter it to the receiving device D_RX.

In practice, the transmitting device D_TX is associated with a frequency band, called "influence band", which corresponds to the frequency band in which the antenna is configured to receive/backscatter signals. When said influence band is included in the emission band associated with the source SO, it is referred to as "working band". By "working band", reference is made here to the fact that the transmitting device D_TX is compatible with the source SO, namely therefore that the backscatter can be performed for any frequency comprised in said working band.

However, nothing excludes considering an influence band that is not included in the emission band. It is nevertheless implicit that for the transmitting device D_TX to be configured to backscatter the ambient signal, said influence band and said emission band must present a non-empty intersection, the working band therefore corresponding to this intersection.

It should furthermore be noted that the antenna 100 equipping the transmitting device D_TX is not only configured to allow the backscatter of the ambient signal emitted by the source SO, but also to transmit and receive, in a conventional manner, radio signals via respectively the emission chain C_TX and the reception chain C_RX.

In the present embodiment, the receiving device D_RX is equipped with a reception antenna (not represented in the figures) configured to receive signals in said working band. For example, said receiving device D_RX is a cell phone of the smartphone type.

It should however be noted that no limitation is attached to the number of antennas that can equip the receiving device D_RX.

In general, no limitation is attached to the structural forms that can be taken respectively by the source SO and the receiving device D_RX. By way of non-limiting examples, the following configurations can be envisaged depending on the considered working frequency band:

- the source SO is a cell phone, for example of the smartphone type, and the receiving device D_RX is a base station,
- the source SO and the receiving device D_RX are both cellular telephones, for example of the smartphone type,
- the source SO is a home gateway (also called Internet box) emitting a Wi-Fi signal, and the receiving device D_RX is a cell phone, for example of the smartphone type, etc.

It should furthermore be noted that the antenna equipping the receiving device D_RX is not only configured to allow the interaction with the signal backscattered by the transmitting device D_TX, but also to receive, in a conventional manner, radio signals via a reception chain and an electronic unit whose configurations are respectively similar to those of the reception chain C_RX and of the DSP unit equipping the transmitting device D_TX.

FIG. 3 schematically represents an example of hardware architecture of the controlling device D_CO according to the invention configured to implement said control method.

As illustrated in FIG. 3, the controlling device D_CO according to the invention has the hardware architecture of a computer. Thus, such a controlling device D_CO includes, in particular, a processor 1, a random access memory 2, a read only memory 3 and a non-volatile memory 4. It further has a communication module 5.

The communication module 5 in particular allows the controlling device D_CO to transmit control signals to the switching means 110. This communication module 5 includes for example a computer data bus capable of transmitting said control signals. According to another example, the communication module 5 include a wired or wireless communication interface configured to implement any suitable protocol known to those skilled in the art (Ethernet, Wifi, Bluetooth, 3G, 4G, 5G, etc.).

The read only memory 3 of the controlling device D_CO constitutes a recording medium in accordance with the invention, readable by the processor 1 and on which a computer program PROG in accordance with the invention is recorded, including instructions for the execution of steps of the control method according to the invention. The program PROG defines functional modules of the controlling device D_CO, which are based on or control the hardware elements 2 to 5 of the controlling device D_CO mentioned above, and which comprise in particular a controlling module MOD_CO configured to control said switching means 110 so that the front-end module alternates between said first mode M_1 and second mode M_2. In this way, the communication device D_TX can backcast the ambient signal from the source SO.

In this exemplary embodiment, said controlling module MOD_CO is further configured to control the switching means 110 so that the transmitting device D_TX is configured to emit data by means of the emission chain C_TX and receive data by means of the reception chain C_RX. In other words, in this example, the controlling module MOD_CO allows the transmitting device D_TX to communicate in a conventional manner with the receiving device D_RX.

However, nothing excludes envisaging, following other examples not detailed here, that the controlling module MOD_CO is only configured to allow communication by ambient backscatter, and that another controlling module of the transmitting device D_TX is for its part configured to allow conventional communication via the emission chain C_TX/reception chain C_RX.

In a manner known per se, and as already mentioned before, the ambient backscatter communication consists of the use of the ambient signal, by the transmitting device D_TX, to send data to said receiving device D_RX. The sending of such data by variation of the backscatter of the ambient signal is essentially based on the possibility of modifying the impedance presented to the antenna 100, based on said data to be sent.

In accordance with the invention, this impedance modification is made possible through the first configuration mode M_1 and the second configuration mode M_2 of the front-end module. In this way, the transmitting device D_TX is associated with operating states, namely ideally a state called "backscatter" state (the transmitting device D_TX can backscatter the ambient signal) in one of said modes M_1, M_2, as well as a contrary state called "non-backscatter" state (the transmitting device D_TX cannot backscatter the ambient signal, or, in other words, is "transparent" to the ambient signal) in the other of said modes M_1, M_2. The impedance associated with the backscatter state typically corresponds to a zero or infinite impedance, whereas the impedance associated with the non-backscatter state typically corresponds to the conjugate complex of the characteristic impedance of the antenna in the propagation medium considered at the considered frequency.

It is important to note that the invention is not limited to this ideal case in which only two states respectively perfectly backscattering and perfectly non-backscattering would be considered. Indeed, the invention also remains applicable in the case where two states (first state and second state) are not perfectly backscattering/non-backscattering, since the variation of the backscattered waves is perceptible by a practically and economically feasible receiving device.

Data intended to be transmitted by the transmitting device D_TX are conventionally encoded by means of a set of symbols, comprising for example a symbol called "high" symbol (bit of value "1"), or a symbol called "low" symbol (bit of value "0"). The transmission of such data by variation of the ambient backscatter can therefore be carried out, in a manner known per se, by alternating between said first configuration mode M_1 and second configuration mode M_2 of the front-end module, each of said modes M_1, M_2 being dedicated to the transmission of a symbol of a particular type (for example high symbol for the first mode M_1 and low symbol for the second mode M_2, or vice versa). In other words, the data intended to be transmitted by the transmitting device D_TX are transported to the receiving device D_RX by modulation of the waves emitted by the source SO (i.e. by retromodulation).

In general, the specific aspects regarding the signal processing techniques for the emission of data by ambient backscatter destined for the receiving device D_RX, as well as those regarding the signal processing techniques for the decoding that are implemented implemented by the latter, are known to those skilled in the art and depart from the scope of the present invention. Consequently, they are not detailed here further.

The remainder of the description aims to detail several embodiments of the switching means 110 belonging to the hardware architecture of the transmitting device D_TX of FIG. 2. Each of these embodiments offers the possibility of alternating, via appropriate commands generated by the controlling module MOD_CO of the controlling device D_CO, between said first mode M_1 and second mode M_2 of the front-end module.

FIG. 4 schematically represents a first embodiment of said switching means 110.

As illustrated in FIG. 4, the switching means 110 include in this first embodiment first switching means 111 configured to selectively connect the antenna 100 to the emission chain C_TX or to the reception chain C_RX.

For example, said first switching means 111 are a duplexer of a design known per se, that is to say an electronic component allowing the use of the antenna 100 for the emission and the reception.

In said first mode illustrated in FIG. 4, said switching means 110 also include second switching means 112 configured to selectively switch off (abbreviation "OFF" in FIG. 4) or power (abbreviation "ON" in FIG. 4) a given electronic piece of equipment of the emission chain C_TX.

Said second switching means 112 are for example a selection switch of design known per se. In general, those skilled in the art know how to implement switching means designed to selectively switch off or power an electronic piece of equipment of the emission chain C_TX, as described for example in the document by J. Wu et al. already mentioned before.

Furthermore, and by way of non-limiting example, the electronic piece of equipment that can be switched off or powered by said second switching means 112 is the power amplifier 103. In many conventional electronic apparatuses, said power amplifier 103 constitutes the electronic piece of equipment of the emission chain C_TX that is the most energy-consuming.

It should however be noted that the choice of a given electronic piece of equipment of the emission chain, to be switched off or powered by said second switching means 112, constitutes only one variant of implementation of the invention. Thus, a choice that differs from said power amplifier 103 can be envisaged, such as for example said digital-analog converter 101, the modulator 102, etc.

Ultimately, in the first embodiment illustrated in FIG. 4, the first mode M_1 of the front-end module corresponds to a configuration in which the emission chain C_TX is connected to the antenna 100 thanks to said first switching means 111 and in which said given electronic piece of equipment is switched off thanks to said second switching means 112.

Conversely, the second mode M_2 of the front-end module corresponds to a configuration in which the emission chain C_TX is connected to the antenna 100 thanks to said first switching means 111 but in which said given electronic piece of equipment is powered thanks to said second switching means 112.

In other words, the impedance variation between the first M_1 and second M_2 configuration modes of the front-end module results from the fact that the electronic piece of equipment considered in the emission chain C_TX is selectively switched off or powered.

It emerges from what has just been described with reference to FIG. 4 that the controlling of the impedance variation is carried out here via the emission chain C_TX of the front-end module. Consequently, in this first embodiment, the emission chain C_TX is still designated by "processing chain".

FIG. 5 schematically represents a second embodiment of said switching means 110.

Said second embodiment is substantially similar to that of the first embodiment of FIG. 4, except that the processing chain here no longer corresponds to the emission chain C_TX but to the reception chain C_RX.

Hence, and as illustrated in FIG. 5, the switching means 110 further include first switching means 111 configured to selectively connect the antenna 100 to the emission chain C_TX or to the reception chain C_RX. All the characteristics described above with reference to FIG. 4 for said first switching means 111 remain valid here.

The switching means 110 include second switching means 113 configured to selectively switch off or power a given electronic piece of equipment of the reception chain C_RX.

Said second switching means 113 are for example a selection switch of a design known per se. In general, those skilled in the art know how to implement switching means designed to selectively switch off or power an electronic piece of equipment of the reception chain C_RX, as described for example in the document by F. Li et al. already mentioned before.

Furthermore, and by way of non-limiting example, the electronic piece of equipment that can be switched off or powered by said second switching means 113 is the low-noise amplifier 104.

It should however be noted that the choice of a given electronic piece of equipment of the reception chain, to be switched off or powered by said second switching means 113, only constitutes one variant of implementation of the invention. Thus, a choice that differs from said low-noise amplifier 104 can be envisaged, such as for example the demodulator 105, said analog-digital converter 106, etc.

Ultimately, in the second embodiment illustrated in FIG. 5, the first mode M_1 of the front-end module corresponds to a configuration in which the reception chain C_RX is connected to the antenna 100 thanks to said first switching means 111 and in which said given electronic piece of equipment is switched off thanks to said second switching means 113.

Conversely, the second mode M_2 of the front-end module corresponds to a configuration in which the reception chain C_RX is connected to the antenna 100 thanks to said first switching means 111, but in which said given electronic piece of equipment is powered thanks to said second switching means 113.

In other words, the impedance variation related to the antenna by the reception chain C_RX between the first configuration mode M_1 and second configuration mode M_2 of the front-end module results from the fact that the electronic piece of equipment considered in the reception chain C_RX is selectively switched off or powered.

FIG. 6 schematically represents a third embodiment of said switching means 110.

As illustrated in FIG. 6, said third embodiment is substantially similar to those of said first and second embodiments (respectively FIG. 4 and FIG. 5) in that the switching means 110 include first switching means 111 configured to selectively connect the antenna 100 to the emission chain C_TX or to the reception chain C_RX. All the characteristics described above with reference to FIGS. 4 and 5 for said first switching means 111 remain valid here, these first switching means 111 therefore being configured to modify the impedance matching between the antenna 100 and the emission chain C_TX or the reception chain C_RX.

Said switching means 110 also include second switching means 114 belonging to the emission chain C_TX. Said second switching means 114 include an impedance matching circuit CIR_Z configurable according to at least two distinct configurations, a first configuration and a second configuration.

More particularly, in the example of FIG. 6, said first configuration (respectively said second configuration) corresponds to a configuration according to which the impedance matching circuit CIR_Z modifies the impedance presented to the antenna 100 via a first capacitor CH_1 (respectively a second capacitor CH_2).

The design and the implementation of such an impedance matching circuit are known to those skilled in the art, so that this aspect is not described further here. At the very least, it is mentioned here that said impedance matching circuit CIR_Z is arranged in the emission chain C_TX at the foot of the antenna 100, that is to say after the power amplifier 103 in the direction from the DSP unit to said antenna 100.

Ultimately, said first mode M_1 corresponds to a configuration in which the emission chain C_TX is connected to the antenna 100 thanks to said first switching means 111 and in which the impedance matching circuit CIR_Z is configured according to said first configuration thanks to said second switching means 114.

Conversely, said second mode M_2 corresponds to a configuration in which the emission chain C_TX is connected to the antenna 100 thanks to said first switching means 111 and in which the impedance matching circuit CIR_Z is configured according to said second configuration thanks to said second switching means 114.

In other words, the impedance variation between the first configuration mode M_1 and second configuration mode M_2 of the front-end module results from the fact that the capacitor used by the impedance matching circuit CIR_Z is either the first capacitor CH_1 or the second capacitor CH_2.

Although the third embodiment of FIG. 6 has been described by considering only two capacitors CH_1, CH_2 of the impedance matching circuit CIR_Z, it should be noted that no limitation is attached to the number of capacitors through which the impedance matching circuit CIR_Z can modify the impedance presented to the antenna 100, as soon as this number is greater than or equal to two (in this case, the impedance circuit CIR_Z is configurable according to as many configurations as the number of capacitors).

Of course, the choice consisting in considering capacitors to modify the impedance presented to the antenna 100 thanks to the impedance circuit CIR_Z only represents one variant of embodiment of the invention. Thus, it is possible to envisage, as an alternative or in combination with capacitors, inductors, resistors, etc., and more broadly any electronic component having an impedance of its own.

FIG. 7 schematically represents a fourth embodiment of said switching means 110.

As illustrated in FIG. 7, the switching means 110 of this fourth embodiment are configured to selectively connect the antenna 100 to the emission chain C_TX or to the reception chain C_RX.

The switching means 110 of this fourth embodiment therefore correspond only to the first switching means 111 described above with reference to FIG. 4 (first embodiment) or FIG. 5 (second embodiment) or to FIG. 6 (third embodiment).

In other words, in this fourth embodiment, and in comparison with said first and second embodiments, switching means specifically dedicated to switching off or powering an electronic piece of equipment dedicated to one of the emission chain C_TX/reception chain C_RX are not implemented. Or, in comparison with the third embodiment, switching means configured to modify the impedance presented to the antenna 100 via loads of an impedance matching circuit are not implemented.

Ultimately, in the third embodiment of FIG. 7, the first mode M_1 of the front-end module corresponds to a configuration in which the emission chain C_TX is connected to the antenna 100 thanks to said switching means 110.

Conversely, the second mode M_2 of the front-end module corresponds to a configuration in which the reception chain C_RX is connected to the antenna 100 thanks to said switching means 110.

In other words, the variation in impedance between the first configuration mode M_1 and second configuration mode M_2 of the front-end module results from the fact that the antenna is connected either to the emission chain C_TX or to the reception chain C_RX.

The invention has been described so far by considering said first, second, third and fourth embodiments. Other embodiments can nevertheless be envisaged.

For example, nothing excludes having switching means 110 comprising:

- first switching means configured to selectively connect the antenna 100 to the emission chain C_TX or to the reception chain C_RX, as well as:
- second switching means configured to selectively switch off or power a given electronic piece of equipment of the emission chain C_TX (i.e. second switching means similar to the second switching means described with reference to FIG. 4),
- third switching means configured to selectively switch off or power a given electronic piece of equipment of the reception chain C_RX (i.e. third switching means similar to the second switching means described with reference to FIG. 5).

According to another example, the switching means 110 can include:

- first switching means configured to selectively connect the antenna 100 to the emission chain C_TX or to the reception chain C_RX, as well as:
- second switching means belonging to the emission chain C_TX, and including an impedance matching circuit configured to modify the impedance presented to the antenna 100 via at least two distinct electronic components of said impedance matching circuit (i.e. second switching means similar to the second switching means described with reference to FIG. 6),
- third switching means belonging to the reception chain C_RX, and including an impedance matching circuit configured to modify the impedance presented to the antenna 100 via at least two distinct electronic components of said impedance matching circuit (i.e. third switching means similar to the second switching means described with reference to FIG. 6, except that they belong here to the reception chain C_RX).

In general, the invention covers any technically possible combination of said first, second, third and fourth embodiments.

The invention further relates to a method for controlling the operation of the transmitting device D_TX. This control method is implemented by the controlling device D_CO equipping said transmitting device D_TX, more particularly by the controlling module MOD_CO.

In its general principle, said control method includes a step of controlling the switching means 110 so that the front-end module alternates between said first mode M_1 and second mode M_2 and thus so that said transmitting device D_TX selectively varies its backscatter of the ambient signal emitted by the source SO.

FIG. 8 represents, in the form of a flowchart, one particular example of implementation of the control method according to the invention.

In this particular example of implementation, it is assumed that the transmitting device D_TX wishes to transmit by ambient backscatter data to the receiving device D_RX, and that these data take the form, before transmission to the receiving device D_RX, of a signal including a sequence of high and low symbols assigned respectively to the data bits (1 or 0). It is further considered that a symbol corresponding to a bit 1 (respectively to a bit 0) is intended to be transmitted by ambient backscatter when the front-end module is configured according to its first mode M_1 (respectively its second mode M_2).

In this particular exemplary implementation, it is also considered that the switching means 110 are configured such as those described with reference to FIG. 4, and that the electronic piece of equipment which can be switched off or powered is the power amplifier 103.

Hence, when the controlling module MOD_CO becomes aware of the type of data to be transmitted, more particularly of the symbols and their respective order within the sequence, it generates appropriate control signals, these control signals being transmitted to the switching means 110.

Thus, the control step (step F10) first of all includes the generation (step F10_1) of a first control signal S_COM_0 transmitted to the first switching means 111 so that the antenna 100 is connected to the emission chain C_TX. According to one variant of implementation, if it is detected that said emission chain is already connected to the antenna 100, such a first control signal S_COM_0 is not generated.

Subsequently, the control step includes the generation of other control signals S_COM_i (iterations of a step F10_2), i being an integer index greater than or equal to 1. These other control signals S_COM_i are for their part transmitted to the second switching means 112 in order to obtain, depending on the data to be transmitted (bit 1 or bit 0), an alternation between said first mode M_1 and second mode M_2 of the front-end module, and therefore ultimately an impedance variation necessary for the implementation of a transmission by selective variation of the ambient backscatter (i.e. by retromodulation).

It is of course understood that the number of these other generated signals depends on the number of times where the type of symbols alternates between bit 1 and bit 0. In other words, and more generally, the alternation between the first mode M_1 and second mode M_2 of the front-end module, and therefore ultimately the associated impedance variation (presented to the antenna), takes place based on the data to be transmitted by ambient backscatter.

From such an example of implementation of the control method, those skilled in the art are able to implement said control method according to all the modes covered by the present invention, particularly according to said first (FIG. 4), second (FIG. 5), third (FIG. 6) and fourth (FIG. 7) modes described above.

Of course, the control method according to the invention is not limited to allowing a communication by selective variation of the ambient backscatter between the transmitting device D_TX and receiving device D_RX. Particularly, given the respective hardware configurations of these devices, nothing excludes that they exchange data with each other in a conventional manner (i.e. by means of their respective emission/reception chains). The control method according to the invention can therefore include other steps of controlling the switching means so as to allow such a conventional data exchange.

For example, consider again that the switching means 110 are configured as those described with reference to FIG. 4, and that the electronic piece of equipment which can be switched off or powered is the power amplifier 103. Assume further that the first switching means 111 are already configured so that the antenna 100 is connected to the emission chain C_TX (for example thanks to an appropriate control signal). Hence, in the case where data must be transmitted via the emission chain C_TX (these data therefore being intended to be radiated by the antenna 100), the controlling module MOD_CO can generate, during the implementation of the control method, a control signal transmitted to the second switching means 112 so that the power amplifier 103 is powered. Conversely, in the case where no data is to be transmitted via the emission chain C_TX, the controlling module MOD_CO can generate, during the control method, a control signal transmitted to the second switching means 112 so that the power amplifier 103 is switched off.

FIG. 9 schematically represents an example of a data transmission scenario implemented by the transmitting device D_TX.

In this FIG. 9, it is considered in a non-limiting manner that the switching means 110 are configured such as those described with reference to FIG. 4, and that the electronic piece of equipment which can be switched off or powered is the power amplifier 103.

It is further considered that a symbol corresponding to a bit 1 (respectively to a bit 0) and belonging to a data message intended to be transmitted by ambient backscatter is associated with the first mode M_1 (respectively with the second mode M_2) of the front-end module. Of course, it is understood that this choice is purely arbitrary.

It is also considered that a time instant Ti is prior to a time instant Tj for an integer index i less than an integer index j. Finally, when data are emitted in a conventional manner during a time period, the latter is represented with hatching in FIG. 9.

In the example of FIG. 9, the transmitting device D_TX first emits data over a long range, for example several kilometers, between an instant T1 and an instant T2. The emission of these data is carried out in a conventional manner via the emission chain C_TX and the antenna 100 (i.e. the antenna 100 radiates radio-frequency energy provided locally between the instants T1 and T2). In other words, between the instants T1 and T2, the first switching means 111 are configured so that the emission chain C_TX is connected to the antenna 100, and the second switching means 112 are configured so that the amplifier 103 is powered. In other words, and although the emission considered between the instants T1 and T2 is not implemented according to the principle of the ambient backscatter, the front-end module is here configured according to the first mode M_1.

Thereafter, the transmitting device D_TX has no data to be emitted for a duration comprised between the instant T2 and an instant T3, this duration being greater than a predefined threshold. Hence, from the instant T3, and until an instant T4 from which new data are to be emitted over a long range, the first switching means 111 are configured so that the emission chain C_TX is connected to the antenna 100, and the second switching means 112 are configured so that the amplifier 103 is switched off. In other words, and although the ambient signal is not backscattered between said instants T3 and T4, the front-end module is here configured according to the second mode M_2. In this way, it is possible to save the energy consumed by D_TX between the instants T3 and T4.

The choice of a threshold from which the power amplifier 103 is turned off only constitutes one variant of implementation of the invention. For example, this threshold can be equal to a few microseconds or a few milliseconds, or even a second.

In the case where the communication network considered for the exchange of data between the transmitting device D_TX and the receiving device D_RX is of the 5G type, examples of values of such a threshold are given in the document: "Optimal Policies of Advanced Sleep modes for Energy-Efficient 5G Networks", F. E. Salema, T. Chahed, E. Altman, A. Gati, Z. Altman, Arxiv, 2019.

Subsequently, between the instant T4 and an instant T5, as well as between instants T6 and T7, as well as between instants T8 and T9, data are emitted in a manner similar to what has been described above for the duration comprised between the instants T1 and T2.

As illustrated in FIG. 9, the power amplifier 103 is not turned off between the instants T5 and T6 insofar as the duration separating these two instants is below said threshold. The same is true for the duration comprised between the instants T7 and T8.

Finally, between the instant T9 and an instant T10, the transmitting device D_TX backscatters (i.e. retromodulates) the ambient signal to emit data in the form of the following message: 01000110. To this end, an alternation between the first mode M_1 and the second mode M_2 is controlled by the controlling module MOD_CO. The sequence of the corresponding modes is as follows: M_2, M_1, M_2, M_2, M_2, M_1, M_1, M_2.

It should be noted that, independently of the embodiment considered for the switching means 110, the alternation between time periods following which the transmitting device D_TX emits data in a conventional manner, or does not emit data, or transmits data by ambient backscatter, can be implemented according to a predetermined time scheme known to the transmitting device D_TX and receiving device D_RX. Such a scheme is for example defined by a telecommunications standard.

For example, the example described above with reference to FIG. 9 can be implemented via a predetermined time scheme comprising four time periods:

- a first period comprised between the instants T1 and T2,
- a second period comprised between the instants T3 and T4 (this second period can also encompass the period comprised between the instants T2 and T3 if it is known in advance that no data is to be emitted from the instant T2),
- a third period comprised between the instants T4 and T9,
- a fourth period comprised between the instants T9 and T10.

Alternatively, the alternation between time periods according to which the transmitting device D_TX emits data in a conventional manner, or does not emit data, or transmits data by ambient backscatter, can be implemented dynamically.

For example, signaling messages can be exchanged between the emitting source SO and the transmitting device D_TX. These messages are configured so that once received by the transmitting device D_TX, the latter knows in which mode its front-end module must be configured. According to another example, the transmitting device D_TX can emit by backscatter, as a preamble to the data, a pattern well known to the receiving device D_RX and which allows the latter to detect the imminence of the data transmission.

Furthermore, the invention also relates to a communication method implemented by the wireless communication system 10 of FIG. 1, in which the ambient signal emitted by the emitting source SO is backscattered by the transmitting device D_TX and received by the receiving device D_RX.

Similarly to what was mentioned previously, the communication method according to the invention covers not only the case where the transmitting device D_TX and receiving device D_RX communicate with each other by ambient backscatter, but of course also the cases where they exchange data with each other in a conventional manner (i.e. via their respective emission/reception chains and by active radiation from their antennas).

The invention claimed is:

1. A device for controlling the operation of a wireless communication device, the wireless communication device comprising:

an antenna, a front-end module configured for the emission and reception of signals via said antenna according to a time division multiplexing scheme, and switching means designed to configure said front-end module according to at least two modes including:

a first mode in which the front-end module presents a first impedance to the antenna, and a second mode in which the front-end module presents a second impedance to the antenna, said first and second impedances being distinct from each other, and said controlling device being configured to be integrated with said communication device and including a controlling module configured to control said switching means so that the front-end module alternates between said first and second modes so that the communication device selectively varies its ambient signal backscatter.

2. The device of claim 1, wherein the ambient signal is backscattered under the controlling of the impedance variation operated by said controlling device.

3. The device of claim 1, wherein the front-end module includes an emission chain and a reception chain, the switching means including:

first switching means configured to selectively connect the antenna to the emission chain or to the reception chain, and second switching means configured to selectively switch off or power a given electronic piece of equipment of a processing chain, among said emission and reception chains, said first mode corresponding to a configuration in which the processing chain is connected to the antenna via said first switching means and in which said electronic piece of equipment is switched off via said second switching means, and said second mode corresponding to a configuration in which the processing chain is connected to the antenna via said first switching means and in which said electronic piece of equipment is switched powered via said second switching means.

4. The device of claim 3, wherein the processing chain comprises the emission chain and said electronic piece of equipment comprises a power amplifier or a digital-analog converter.

5. The device of claim 3, wherein the processing chain comprises the reception chain and said electronic piece of equipment comprises a low-noise amplifier or an analog-to-digital converter.

6. The device of claim 1, wherein the front-end module includes an emission chain and a reception chain, the switching means being configured to selectively connect the antenna to the emission chain or to the reception chain, said first mode corresponding to a configuration in which the emission chain is connected to the antenna via said switching means and said second mode corresponding to a configuration in which the reception chain is connected to the antenna via said switching means.

7. The device of claim 1, wherein the front-end module includes an emission chain and a reception chain, the switching means including:

first switching means configured to selectively connect the antenna to the emission chain or to the reception chain, and second switching means belonging to a processing chain among said emission and reception chains, and including an impedance matching circuit configurable according to at least two distinct configurations, a first configuration and a second configuration, said first mode corresponding to a configuration in which the processing chain is connected to the antenna via said first switching means and in which the impedance matching circuit is configured according to said first configuration via said second switching means, and said second mode corresponding to a configuration in which the processing chain is connected to the antenna via said first switching means and in which the impedance matching circuit is configured according to said second configuration via said second switching means.

8. A wireless communication device comprising:

an antenna, a front-end module configured for the emission and reception of signals via said antenna according to a time division multiplexing scheme, and switching means designed to configure said front-end module according to at least two modes including:

a first mode in which the front-end module presents a first impedance to the antenna, a second mode in which the front-end module presents a second impedance to the antenna, said first and second impedances being distinct from each other, said wireless communication device including the controlling device of claim 1.

9. A wireless communication system including:

an emitting source configured to emit an ambient signal, the wireless communication device of claim 8, and a second wireless communication device configured to receive the ambient signal backscattered by said first communication device.

10. A communication method implemented by the wireless communication system of claim 9, the method comprising receiving, by the second wireless communication device, an ambient signal emitted by the emitting source and backscattered by the first wireless communication device.

11. A method for controlling the operation of a wireless communication device, the wireless communication device comprising:

an antenna, a front-end module configured for the emission and reception of signals via said antenna according to a time division multiplexing scheme, and switching means designed to configure said front-end module according to at least two modes including:

a first mode in which the front-end module presents a first impedance to the antenna, a second mode in which the front-end module presents a second impedance to the antenna, said first and second impedances being distinct from each other, said control method being implemented by the controlling device of, integrated with said wireless communication device, the method including controlling said switching means so that the front-end module alternates between said first and second modes so that the communication device selectively varies its ambient signal backscatter.

12. A computer comprising a processor and a memory, the memory having stored upon instructions which, when executed by the processor, cause the computer to implement the method of claim 11.

13. A non-transitory computer-readable storage medium having stored thereon instructions which, when executed by a processor, cause the processor to implement the method of claim 11.

* * * * *